United States Patent [19]

Alling et al.

[11] Patent Number: 5,152,062
[45] Date of Patent: Oct. 6, 1992

[54] METHOD OF MANUFACTURING BALL BEARING RETAINERS

[75] Inventors: Richard L. Alling; Richard W. Shepard, both of Torrington, Conn.

[73] Assignee: The Torrington Company, Torrington, Conn.

[21] Appl. No.: 717,486

[22] Filed: Jun. 19, 1991

[51] Int. Cl.⁵ .............................................. B23P 15/00
[52] U.S. Cl. ........................ 29/898.067; 29/898.065; 384/523
[58] Field of Search ............... 29/898.067, 898.065, 29/160.6, 725; 72/379.2; 384/523, 525, 531, 532, 537

[56] References Cited

U.S. PATENT DOCUMENTS

| | | | |
|---|---|---|---|
| 1,197,466 | 9/1916 | Englerth et al. | 384/532 |
| 1,894,595 | 1/1933 | Mitchel | 29/898.067 X |
| 3,644,971 | 2/1972 | Axbard | 29/898.067 |
| 4,212,095 | 7/1980 | Warchol | 29/898.067 |
| 4,320,565 | 3/1982 | Warchol | 29/898.067 |
| 4,689,982 | 9/1987 | Olschewski et al. | 29/898.067 X |

FOREIGN PATENT DOCUMENTS 7007025  11/1970  Netherlands .

Primary Examiner—Joseph M. Gorski
Assistant Examiner—S. Thomas Hughes
Attorney, Agent, or Firm—Michael H. Minns; John C. Bigler

[57] ABSTRACT

A method for manufacturing ball bearing retainers by forming material into a helical coil consisting of a plurality of coils, then severing a coil of the helical coil to form a split ring, the severed ends overlapping one another. The split ring is then pressed to form a ball pocket opposite the overlapping severed ends. The remaining ball pockets are formed by successively pressing the split ring forming a pair of ball pockets, each ball pocket being adjacent a previously formed ball pocket.

16 Claims, 1 Drawing Sheet

METHOD OF MANUFACTURING BALL BEARING RETAINERS

BACKGROUND OF THE INVENTION

This invention relates generally to a method of manufacturing ball bearing retainers and more particularly to a method of manufacturing ball bearing retainers from narrow strip material.

Prior art ball bearing retainers have been manufactured from wide flat strips of material. First, a ring is sheared from the wide flat strip. Ball pockets are then pressed into the strip to retain the balls at desired intervals. Two rings are used, one on each side. The rings are welded or otherwise locked together. Shearing the retainer from a wide flat strip results in excessive waste material. One common retainer, for example, wastes 71% of the material purchased. Scrap is no longer a salable commodity. The manufacturer must pay to have the scrap disposed of.

In rolled steel, there is a grain or directional quality to the strips. This is a result of discontinuities being elongated along the direction of rolling. In a retainer of the prior art methods, the grain direction will vary. Where the grain is not aligned with the peripheral edges of the retainer, failure of the retainer can occur.

Various methods have been tried to eliminate the waste resulting from shearing the retainer from a wide flat strip. One method forms the retainer from a narrow strip of material. The strip is curved into a ring of approximate finished diameter and the ends are welded together. The ball pockets are then simultaneously pressed into the ring. This method causes excessive thinning of the retainer in the area of the ball pockets which can lead to premature bearing failure, especially in high speed applications.

The foregoing illustrates limitations known to exist in present ball bearing retainer manufacturing methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of manufacturing ball bearing retainers by forming material into a split ring having ends, the ends overlapping one another. The split ring is then pressed to form ball pockets.

The foregoing and other aspects will become apparent from the detailed description of the invention when considered in conjunction with the accompanying drawing figures.

BRIEF DESCRIPTION OF THE DRAWING FIGURES

DETAILED DESCRIPTION

Figure 1:
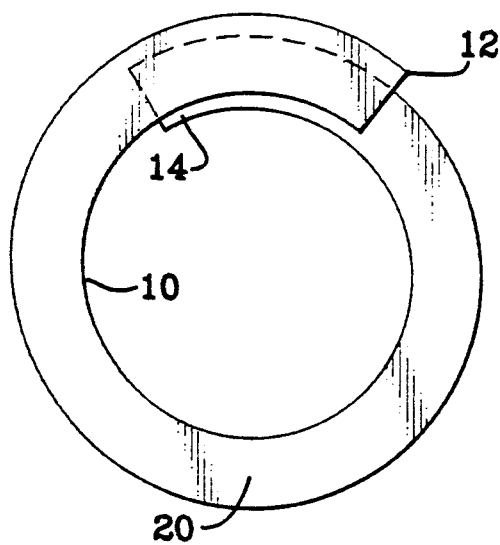
FIG. 1 is a plan view of a coil prior to forming the first ball pocket.

The source material for the retainer of the present invention is a narrow flat strip having a width approximately the same as the width 60 of the finished retainer. The flat strip is initially curled into a split ring 10 with overlapping ends 12, 14 as shown in FIG. 1. The split ring 10 diameter is substantially the same as the finished retainer diameter. The amount of overlap depends upon the material thickness, the ring diameter and the ball pocket depth. For one retainer, the ends 12, 14 overlap by approximately 140 degrees. This particular retainer has an inner diameter of 1 15/16 inches, an outer diameter of 2 5/16 inches and a material thickness of 0.037 inches. Alternatively, the strip may be wound into a helical form resembling a Slinky toy. This helical coil is then cut to form the split ring 10. A wire may be used for the source material. The wire will then be rolled into a flat strip prior to curling the strip into split ring 10.

Because the prior art methods punch the ring from a wide strip of material, the finished retainers have sharp edges which must be removed prior to use. The flat strip used for split ring 10 can be purchased with any edge shape and surface finish desired. A retainer formed using the present method does not require post manufacturing tumbling to remove sharp edges.

Ball pockets 30, 32, 34, 36, 38 are then pressed into the split ring 10. As the ball pockets are formed the excess material from the overlapping ends 12, 14 is gathered into the ball pockets. This prevents thinning of the ball pockets. One prior art method welds the ends of the ring 10 together prior to ball pocket formation. Since there is no excess material and the ring diameter remains relatively constant, the ball pockets are thinner than the rest of the retainer. The thinning caused by the prior art method can lead to premature bearing failure, especially in higher speed applications.

Following is a description of the preferred method of forming ball bearing retainers.

The split ring 10 is then placed into a press to form the ball pockets. For retainers having an odd number of balls, the first ball pocket 30 is formed at a point 20 opposite the center of the overlapping ends 12, 14. For retainers having an even number of balls, two ball pockets are formed, one on either side of point 20.

Figure 2:
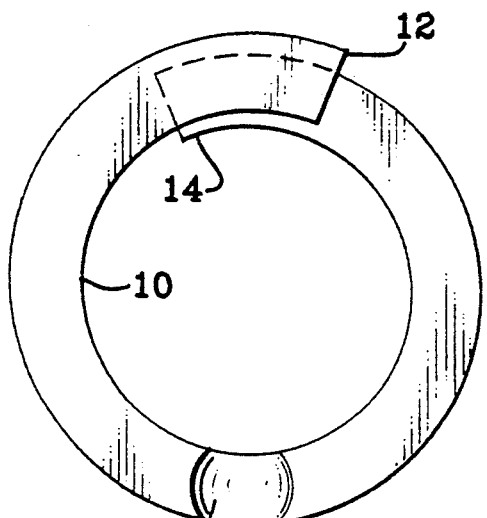
FIG. 2 is a plan view of the coil after forming the first ball pocket.
Figure 3:
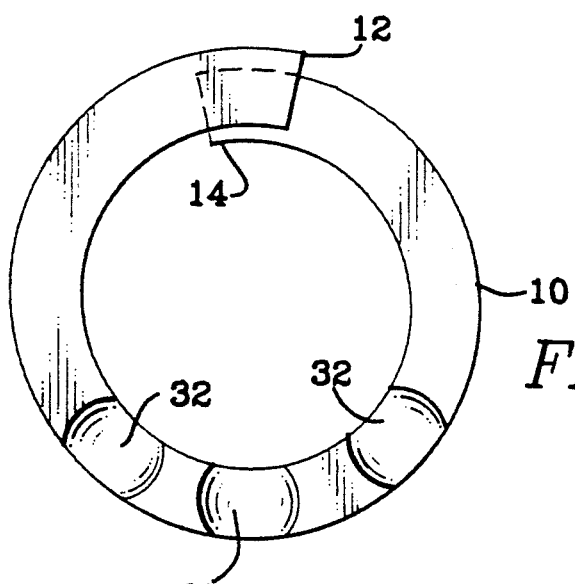
FIG. 3 is a plan view of the coil after forming three ball pockets.
Figure 4:
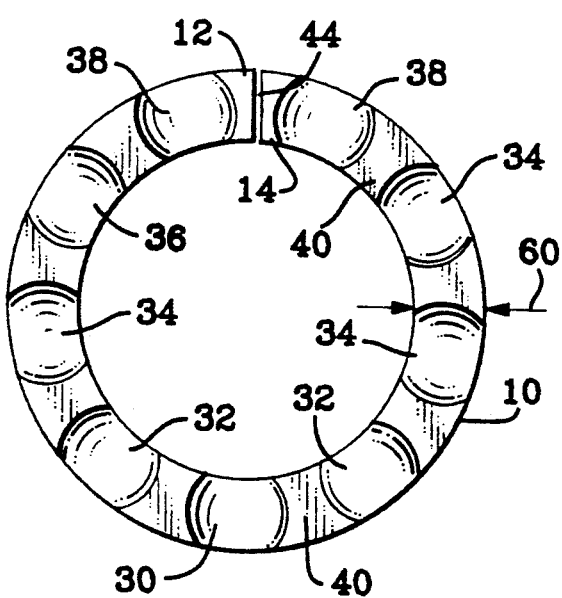
FIG. 4 is a plan view of a ball bearing retainer after forming all the ball pockets.

The remaining ball pockets are formed two at time, one on either side of the previously formed ball pockets. The ball pocket formation progresses from point 20 opposite the center of the overlapping ends 12, 14 towards the overlapping ends 12, 14. As ball pockets are formed, the excess material of the split ring 10 is gathered in the ball pocket reducing the overlap. FIG. 2 shows the reduction in the overlap after forming the first ball pocket 30. FIG. 3 shows the further reduction in overlap between ends 12, 14 after the formation of ball pockets 32. When the last two ball pockets 38 are formed, the two ends 12, 14 should just meet as shown in FIG. 4, as the remaining excess material is gathered in ball pockets 12, 14. It is not necessary for the two ends 12, 14 to abut. There may be a gap 44 between the ends 12, 14.

After the ball pockets are formed in split ring 10, a final pressing operation is applied to form spherical seats in the ball pockets. These spherical seats may be formed in the ball pockets as the ball pockets are formed. The preferred method is to form all the spherical seats in one pressing operation after all the pockets are formed.

After curling the flat strip of material into the split ring 10, it may be necessary to adjust the diameter of the split ring 10. The split ring 10 diameter may be changed by coining the inner peripheral edge or the outer peripheral edge. The inner peripheral edge is coined to enlarge the split ring 10 diameter and the outer peripheral edge is coined to decrease the split ring 10 diameter.

After forming the ball pockets 30, 32, 34, 36, 38, it may also be necessary to adjust the diameter of the split ring 10. The flat areas 40 are coined to increase or decrease the split ring 10 diameter. The inner edges of the flat areas 40 are coined to increase the split ring 10 diameter. The outer edges of the flat areas 40 are coined to decrease the split ring 10 diameter.

In one embodiment, the rings described above are retainer halves of the complete retainer assembly. The bearing balls are placed in the ball pockets of one retainer half. A second retainer half is placed over the bearing balls and the first retainer half. The flat areas 40 between the ball pockets 30, 32, 38, are then fastened together using any of the known techniques such as riveting or welding. The retainer halves are oriented such that the gaps 44 between the ends 12, 14 are not adjacent one another. In one embodiment, each ring is a complete assembly.

Figure 5:
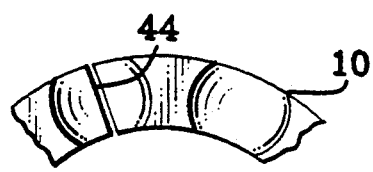
FIG. 5 shows details of a further embodiment of a ball bearing retainer.

In a further embodiment of the present invention, the final ball pocket forming step occurs over the adjacent ends 12, 14 such that the gap 44 occurs in this final ball pocket rather than in the flat 40 between pockets. FIG. 5 shows a portion of the split ring 10 with the gap 44 in a ball pocket. An advantage of placing the gap 44 in a ball pocket is that the flat areas 40 are identical throughout the retainer assembly. This can simplify fastening the retainer halves together.

Having described the invention, what is claimed is:

1. A method of manufacturing ball bearing retainers comprising the steps of:
    forming material into a split ring having ends, the ends overlapping one another; and
    pressing the split ring, thereby forming ball pockets such that the overlapping of the ends is decreased.

2. The method as in claim 1 wherein the material is initially in the form of a wire and including the step of pressing the wire in an intermediate operation.

3. A method as in claim 1 wherein the split ring is formed from a strip of material.

4. The method as in claim 1 including the step of pressing the ball pockets, thereby forming spherical ball pocket seats.

5. The method as in claim 1 wherein the steps of pressing the split ring to form ball pockets includes a further pressing of the split ring, thereby forming spherical ball pocket seats within the ball pockets.

6. A method of manufacturing ball bearing retainers comprising the steps of:
    forming material into a split ring having ends, the ends overlapping one another, the split ring having inner and outer peripheral edges;
    pressing the split ring, thereby forming at least one ball pocket opposite the overlapping ends; and
    successively pressing the split ring, thereby forming additional ball pockets, each ball pocket being adjacent a previously formed ball pocket.

7. The method as in claim 6 wherein the material is initially in the form of a wire and including the step of pressing the wire in an intermediate operation.

8. The method as in claim 6 including the step of pressing the ball pockets, thereby forming spherical ball pocket seats.

9. The method as in claim 6 wherein the last successive pressing step forms only one ball pocket and the ends of the split ring form the final ball pocket.

10. The method as in claim 6 wherein the steps of pressing the split ring to form ball pockets includes further pressing of the split ring, thereby forming spherical ball pocket seats within the ball pockets.

11. The method as in claim 6 wherein the split ring is formed from a strip of material.

12. A method of manufacturing ball bearing retainers comprising the steps of:
    forming material into a helical coil consisting of a plurality of coils;
    severing a coil of said helical coil to form a split ring, the severed ends overlapping one another, the split ring having inner and outer peripheral edges;
    pressing the split ring, thereby forming at least one ball pocket opposite the overlapping severed ends; and
    successively pressing the split ring, thereby forming a pair of ball pockets, each ball pocket being adjacent a previously formed ball pocket.

13. The method as in claim 12 wherein the material is initially in the form of a wire and including the step of pressing the wire in an intermediate operation.

14. The method as in claim 12 including the step of pressing the ball pockets, thereby forming spherical ball pocket seats.

15. The method as in claim 12 wherein the steps of pressing the split ring to form ball pockets includes further pressing of the split ring, thereby forming spherical ball pocket seats within the ball pockets.

16. A method as in claim 12 wherein the split ring is formed from a strip of material.

* * * * *